United States Patent [19]

Forestieri et al.

[11] Patent Number: 5,058,593
[45] Date of Patent: Oct. 22, 1991

[54] APPARATUS FOR PROCESSING AND DISPLAYING ULTRASONIC DATA

[75] Inventors: Steven F. Forestieri; Sheng T. Lin, both of Santa Clara; John J. Lum, San Francisco; William A. Rains, Aptos; Steven A. McNerney, Sunnyvale, all of Calif.

[73] Assignee: Diasonics, Inc., Milpitas, Calif.

[21] Appl. No.: 584,191

[22] Filed: Sep. 18, 1990

[51] Int. Cl.⁵ ............................................. A61B 8/00
[52] U.S. Cl. .......................... 128/661.07; 128/661.09; 358/112; 358/167
[58] Field of Search ...................... 128/660.04, 660.05, 128/661.08, 661.09, 661.07; 358/112, 166, 167

[56] References Cited

U.S. PATENT DOCUMENTS

| | | | |
|---|---|---|---|
| 4,690,150 | 9/1987 | Mayo, Jr. .............................. | 358/112 |
| 4,742,830 | 5/1988 | Tamano et al. ................. | 128/661.09 |
| 4,817,619 | 4/1989 | Sugiyama et al. .............. | 128/661.09 |
| 4,827,942 | 5/1989 | Lipschutz ............................ | 358/112 |
| 4,918,605 | 4/1990 | Shirasaka ........................ | 128/660.05 |

Primary Examiner—Francis Jaworski
Assistant Examiner—George Manuel
Attorney, Agent, or Firm—Blakely, Sokoloff, Taylor & Zafman

[57] ABSTRACT

An apparatus and method for displaying ultrasonic data in real time reflected in a living organism. The apparatus comprises a plurality of analog-to-digital converters for digitizing reflected Doppler signals produced by reflecting a reference pulsed acoustic signal, each of the analog-to-digital converters capable of producing a plurality of digitized Doppler signals. The apparatus futher comprises a plurality of digital signal processors, each of the plurality of digital signal processors coupled to each of the plurality of analog-to-digital converters for processing digitized Doppler signals received from the analog-to-digital converters, each of the digital signal processors capable of producing a plurality of processed digital signals. The apparatus further comprises a controller coupled to the analog-to-digital converters and the digital signal processors for controlling the operation of the analog-to-digital converters and digital signal processors, controlling the receipt of the processed digital signals, and compressing each of the plurality of processed digital signals output from the plurality of digital signal processors into a plurality of signals suitable for display.

12 Claims, 5 Drawing Sheets

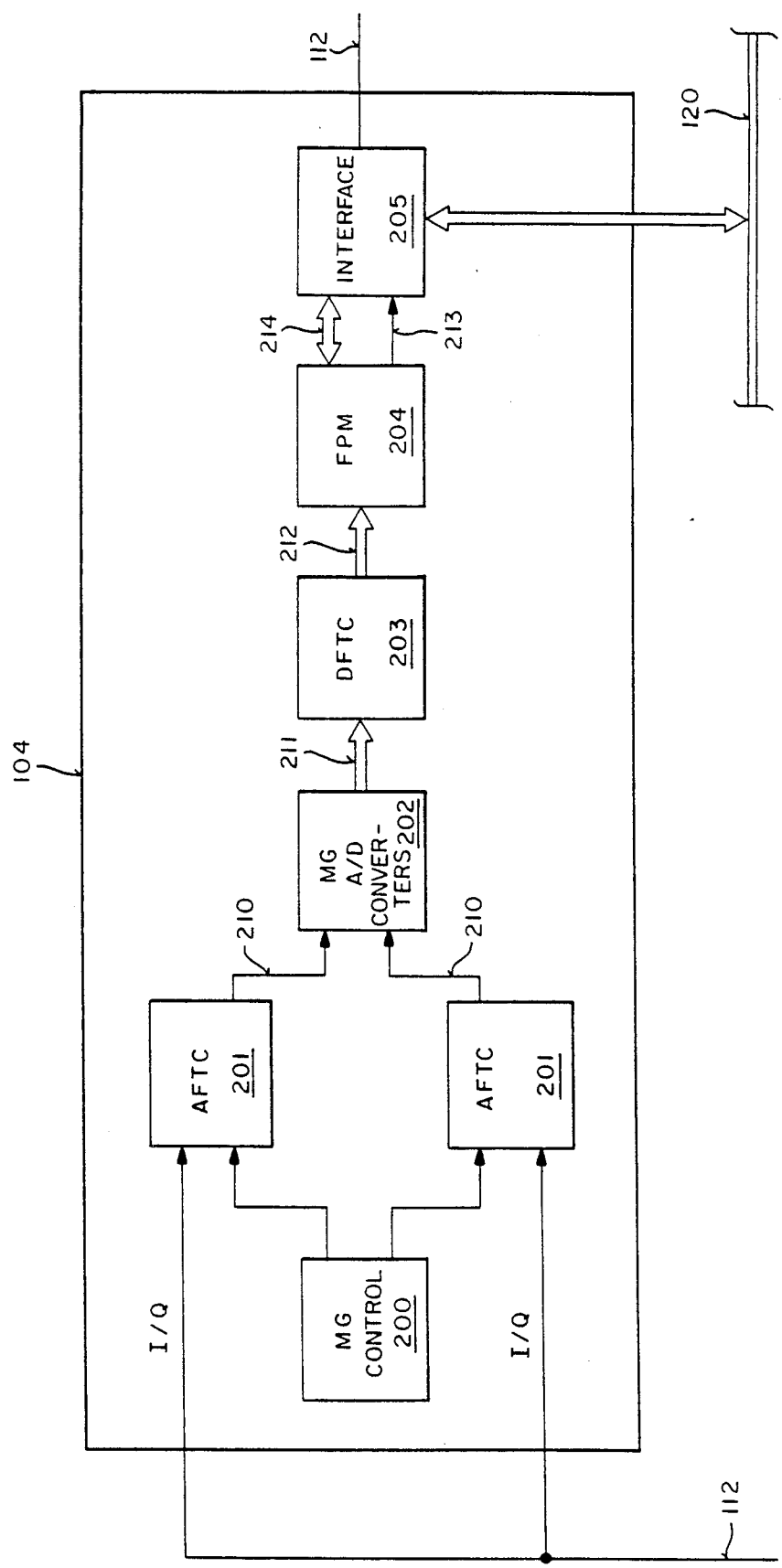
FIG_2 (PRIOR ART)

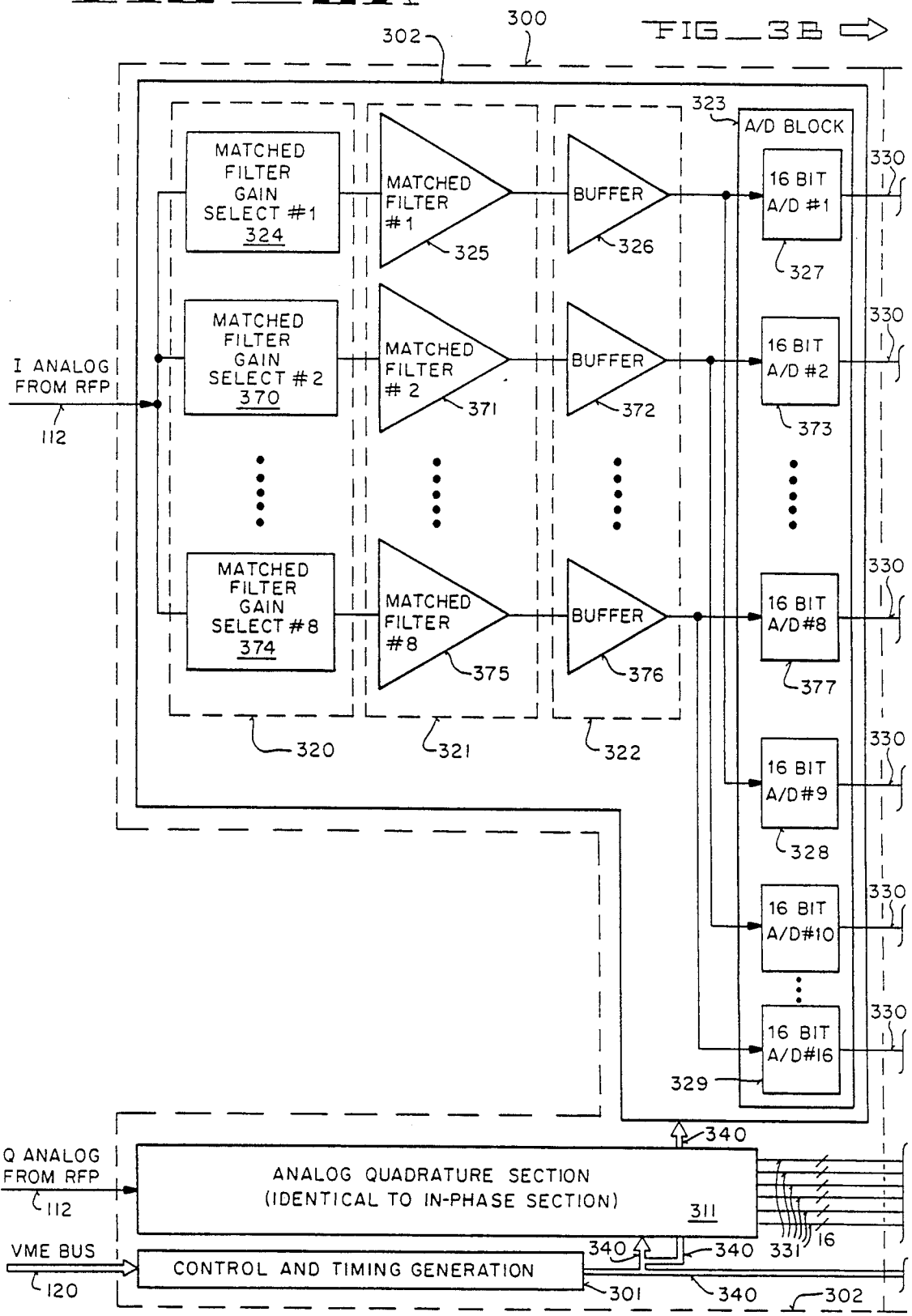

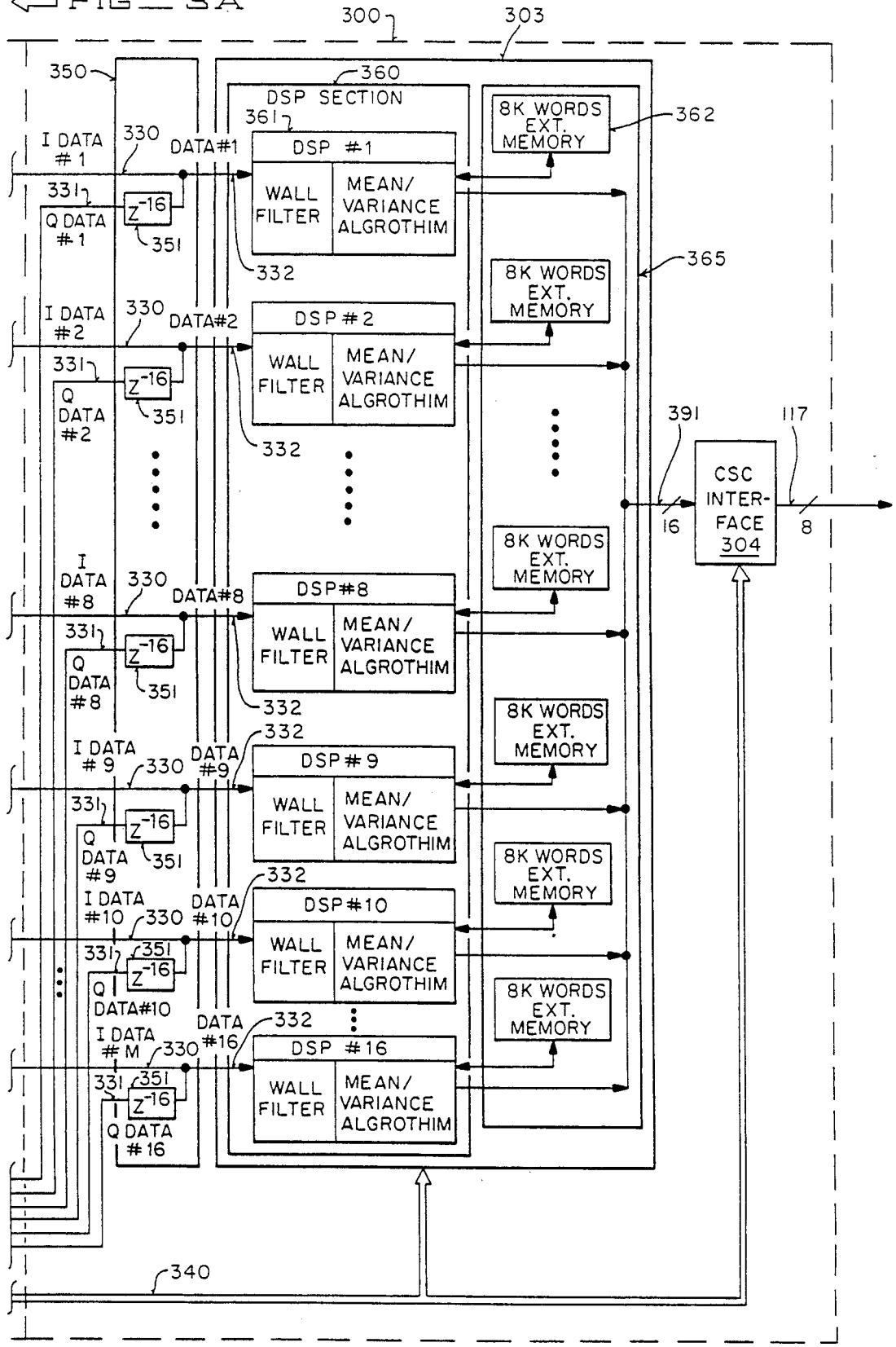

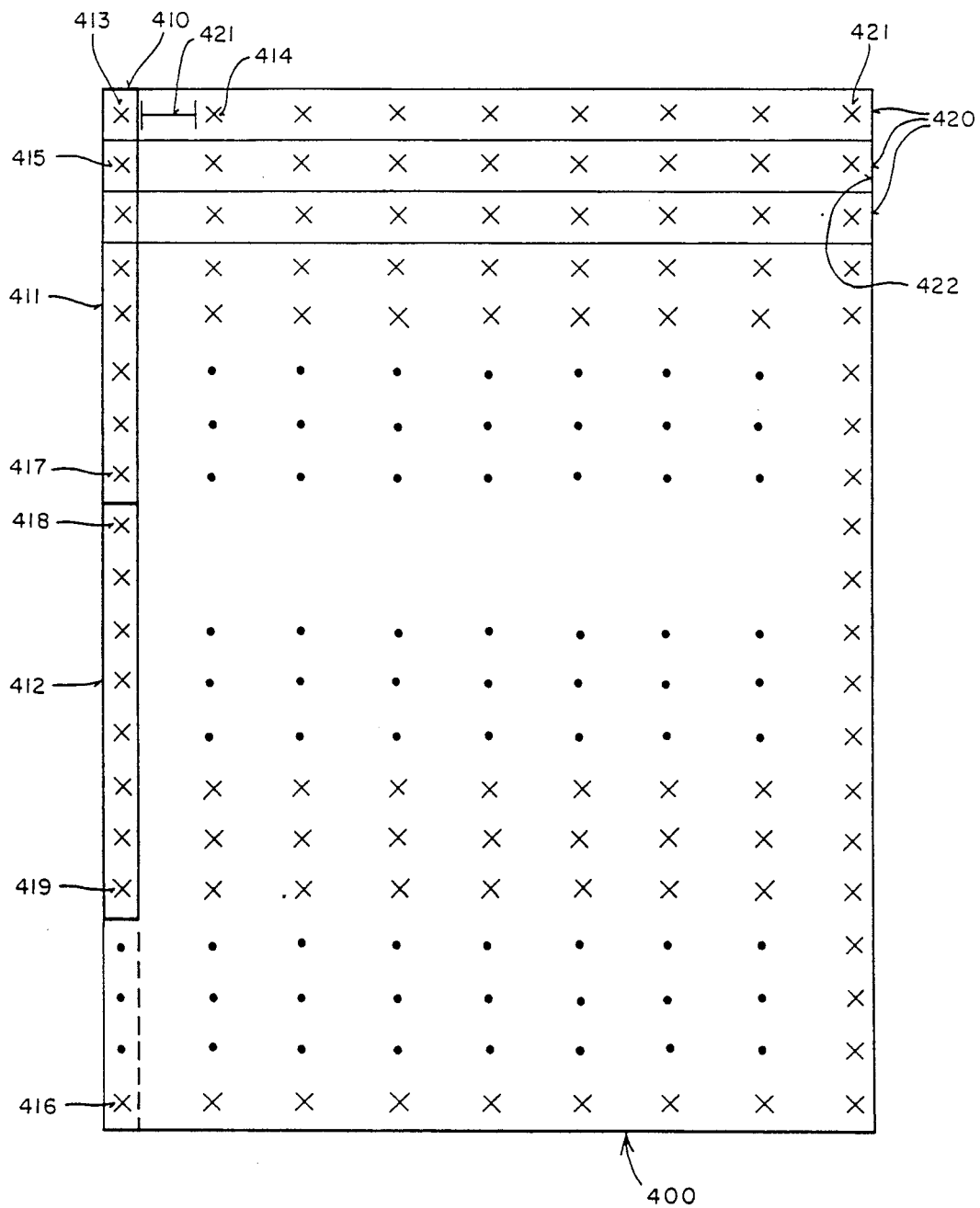
FIG_4

APPARATUS FOR PROCESSING AND DISPLAYING ULTRASONIC DATA

BACKGROUND OF THE INVENTION

1. Field of the Invention

The present invention relates to the field of Doppler ultrasound imaging in living tissue. Specifically, this invention relates to an apparatus for processing ultrasonic data suitable for displaying upon a suitable medium, such as a video display screen, for observation and diagnosis by medical personnel.

2. Prior Art

Images of living organisms typically utilize methods that pass various types of radiation through the body of the animal and measure the output with a suitable detector. For instance, x-ray images are generated by producing x-rays external to the body, passing the x-radiation through the body and observing shadows produced on x-ray sensitive film. Ultrasonic images, in contrast, are formed by producing ultrasonic waves using a transducer, passing those waves through the body, and measuring the properties of the scattered echoes from reflections inside the body using a receptor. Ultrasonic imaging apparatus may be distinguished from other medical imaging apparatus in the respect that they allow the display of soft tissues within the body which show various structural details such as organs and blood flow.

An ultrasonic imaging apparatus utilizes a probe which contains elements for transmitting acoustic pulses throughout tissue, which probe typically also contains receiving circuitry which allows reception of the reflected acoustic pulses. Such probes typically comprise a plurality of elements in a linear fashion such that each of the elements are fired at time intervals to focus on specific parts of the body. In other systems, multiple elements are simulated by means of a moveable mechanical element within the probe wherein the acoustic pulses are transmitted at various intervals along an axis. Each reflective pulse from the acoustic pulses emitted may then be received by a receiving unit located in the probe and transmitted to circuitry within the ultrasound apparatus for processing and generation of a display. This display, known as a b-mode image or two-dimensional image of blood flow velocity, may then be generated by the apparatus and displayed on a video monitor for diagnosis and examination by an attending operator or physician.

The basic principle used in applying the Doppler method for ultrasonic imaging in a pulsed Doppler ultrasound apparatus is described as follows. When blood flow within a living subject is subjected to ultrasonic waves, corpuscles are caused to vibrate slightly while moving and reflect those ultrasonic waves. Because of the corpuscle velocity, the frequency of the reflected waves changes from that of the transmitted waves because of the Doppler effect. The frequency shift may be detected and the amount of the shift may be displayed on a video screen for imaging blood flow in the living subject. Since the amount of shift of the transmitted waves is in relation to the blood flow velocity, the amount of blood flow and the speed of the blood flow may be observed. Noise and other signals (clutter) which have Doppler shift but don't represent blood movement in the body are filtered out, so that the image produced only represents blood flow in motion. In color Doppler imaging the frequency information is then used as blood flow information for forming a two-dimensional image or profile of the blood flow velocity.

One such apparatus used in displaying information obtained from ultrasonic pulses transmitted in the human body is shown in FIG. 1 as imaging system 100. Imaging system 100 generally comprises a probe 101 which is coupled via line 110 to transmitter/receiver circuitry 102. Transmitter/receiver circuitry 102 is designed so that the elements in probe 101 will be fired at specified time intervals, with reflective pulses being detected using probe 101 at another given time interval. Transmitter/receiver circuitry 102 is coupled to a control unit 109 via bus 120. Control unit 109 controls all circuitry in the imaging system via bus 120. Control unit 109 is further coupled to a keyboard 125 and a mouse, trackball or other device 126 for movement and control of information shown on video display 130.

Once a pulse is received by the receiver circuitry within transmitter/receiver 102, such information is transmitted by line 111 to RF (radio frequency) processor 103 for further processing. RF processor 103 processes the RF information to produce an envelope signal and in-phase (I) and quadrature (Q) Doppler signals. These signals are further transmitted via line 114 to a scan converter 105 and to a Doppler processor 106 via lines 114 and 113 for generation of black and white ultrasound information on video display 130. Information generated by Doppler processor 106 via I and Q signals output from RF processor 103 are transmitted via line 115 to scan converter 105. Scan converter 105 then integrates information received from RF processor 103 and Doppler processor 106 and transmits scan line information to video processor 127 via line 116. In addition to information passed to scan converter 105 and Doppler processor 106, RF processor 103 transmits I and Q signals via line 112 to color flow processor 104. Color flow processor 104 is also controlled by control unit 109 via bus 120. Color flow processor 104 is used for detecting Doppler shift and blood flow information in living tissue, and thus transmits such information via line 117 to a color scan converter 108. Such color information is used to graphically represent on video display 130 moving blood flow in a living organism. Color scan converter 108 is used to interpolate scan line information obtained from color flow processor 104, and transmit that information on line 118 and thus to video processor 127 for representation of blood flow in the human body. Video processor 127 then utilizes information obtained from scan converter 105 for display of black and white ultrasound information and color information obtained from color scan converter 108 to generate a color image showing blood flow overlaid on a black and white image showing stationary tissue suitable for output on a video display such as 130 via line 119. Such information may be transmitted in National Television Standards Committee (NTSC) format and thus be stored on video tape for later clinical examination by attending medical personnel.

A more detailed representation of a prior art color flow processor 104 shown in FIG. 1 is shown in FIG. 2. 104 shown in FIG. 2 is representative of a prior art color flow processor. As is shown in FIG. 2, line 112 contains I and Q data from RF processor 103 shown in FIG. 1 to two analog filters 201. The analog filters 201 are used by the color flow processor 104 to filter out clutter information contained within the Doppler signal. In other words, analog filters 201 will eliminate signals contained within the analog Doppler data that indicate no motion. Typically, in a prior art system such as color flow processor 104 shown in FIG. 2, objects with little or no motion generate reflected signals below 150 Hz which will be filtered out by analog filters 201. Analog filters 201 are regulated by color sample volume (CSV) controller 200, and sample each frequency a fixed number of times to generate a continuous average for each color sample volume (CSV). The CSV controller 200 thereby commands analog filters 201 to sample the Doppler signal at fixed time intervals only.

Coupled to analog filters 201 via lines 210 are matched filter analog-to-digital (A/D) converters 202 shown in FIG. 2. A prior art system, such as color flow processor 104, typically comprises a plurality of A/D converters coupled to filters such as analog filters 201, which then digitize the analog signal after clutter has been removed. The matched filter A/D converters 202 are 12 bit resolution converters which take the signal generated by the analog filters 201 and digitize it to 12 bits of accuracy. This information can then be transmitted to a digital filter 203 shown in FIG. 2 via lines 211. Digital filter 203 allow additional removal of clutter information from the Doppler signal which has been digitized, so that an uncorrupted Doppler signal may be obtained which is useful for display upon video display 130 in ultrasound imaging system 100. After the additional clutter has been removed by digital filter 203, the processed information is transmitted via lines 212 to parameter estimator 204. Parameter estimator 204 is used for generating samples of each point along vectors for display on video display 130. Parameter estimator 204 determines the phase shift and direction of that shift for each signal in each CSV to generate flow information. This flow information generally comprises velocity and amplitude information for reflected Doppler signals. In addition to amplitude and velocity information parameter estimator 204 generates variance information. Variance is generally the difference between maximum frequencies and minimum frequencies for a particular time interval. Parameter estimator 204 is further coupled to interface 205 via bus 214 and output line 213. Interface 205 controls signals output from parameter estimator 204 into interface 205 via line 213. Interface 205 then generates appropriate information over line 117 for transmission to color scan converter 108 shown in FIG. 1.

Essentially, color flow processor 104 shown in FIG. 2 requires extensive analog filtering via analog filters 201 prior to digitization of the input Doppler signals for color flow parameter extraction. This is because there is too much clutter in the signal prior to digitizing to resolve a signal with only 12 bits of information. Since various analog processing must be performed prior to digitization, flexibility is lost since information which is filtered out might otherwise be available by adjusting filter parameters. Therefore, an apparatus is required for determining Doppler flow data which allows convenient adjustment of filters for ultrasonic imaging. In addition, since the prior art limited digitization of flow data from color scan vectors to 12 bits, an increase in resolution of such digitized signals would be useful.

SUMMARY AND OBJECTS OF THE INVENTION

One object of the invention is to provide real-time color flow processing and digitization which allows adjustment of input filters for clutter and stationary object removal.

This and other objects are provided for by an apparatus for processing a Doppler signal data in real time which comprises a plurality of analog-to-digital converters for digitizing reflected Doppler signals produced by reflecting a reference pulsed acoustic signal. Each of the analog-to-digital converters is capable of producing a plurality of digitized Doppler signals. The apparatus further comprises a plurality of digital signal processors, each of the plurality of digital signal processors coupled to each of the plurality of analog-to-digital converters for processing digitized Doppler signals received from the analog-to-digital converters. These digital signal processors are capable of producing a plurality of processed digital signals. The apparatus further comprises a controller coupled to the analog-to-digital converters and the digital signal processors for controlling the sampling rates and operation of the analog-to-digital converters and digital signal processors. The controller regulates the receipt of the processed digital signals, and the compression of each of the plurality of processed digital signals output from the plurality of digital signal processors into a plurality of signals suitable for display.

BRIEF DESCRIPTION OF THE DRAWINGS

The present invention is illustrated by way of example and not limitation in the Figures of the accompanying drawings in which like references indicates similar elements and in which:

FIG. 2 shows a detailed representation of a prior art color flow processor in an ultrasonic imaging system.

FIGS. 3A and 3B show a detailed representation of a color flow processor used in the preferred embodiment.

FIG. 4 shows a representation of vectors and color sample volumes used to generate ultrasonic images for display in the preferred embodiment.

DETAILED DESCRIPTION

Figure 1:
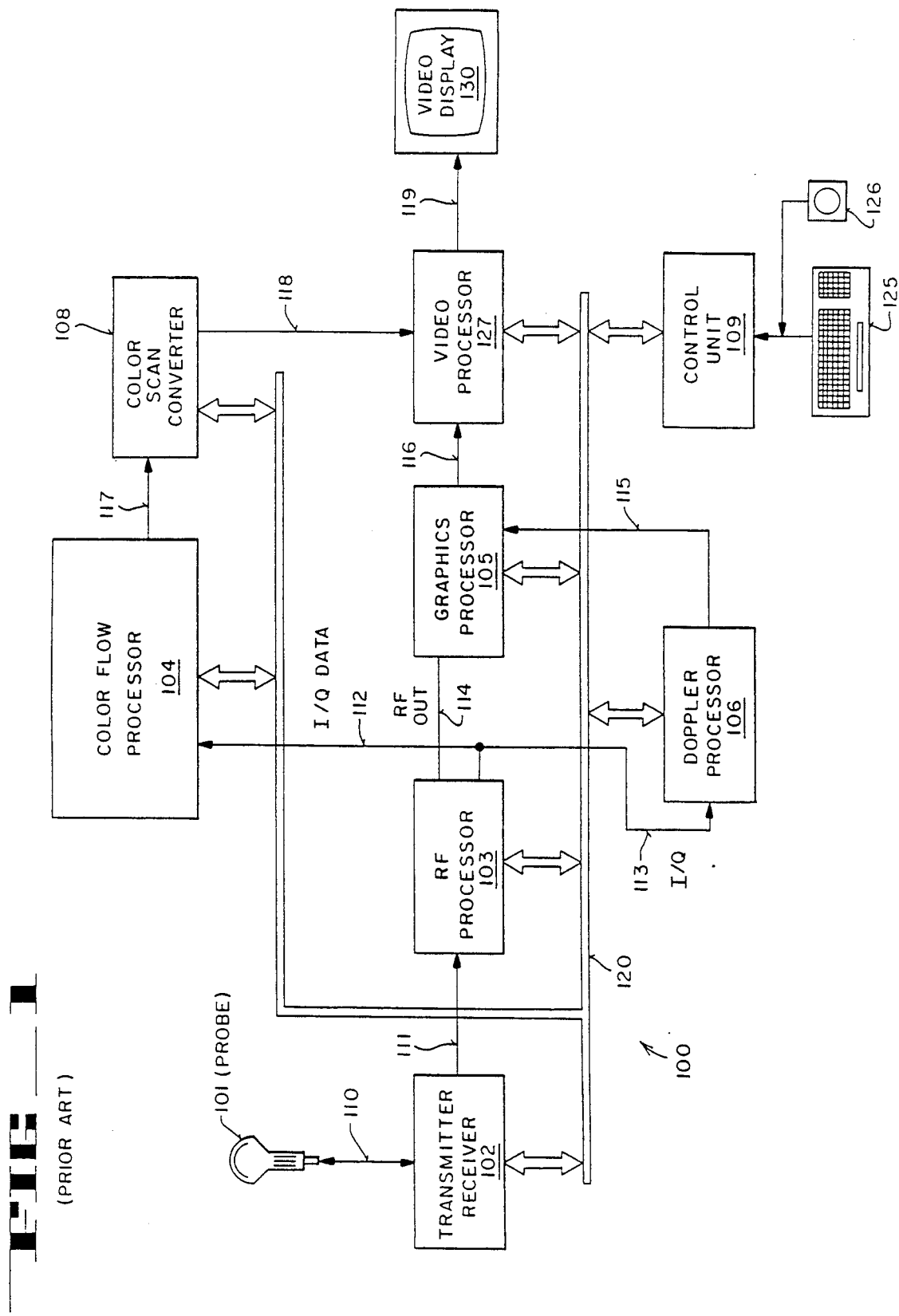
FIG. 1 shows a prior art ultrasonic imaging system.

The present invention covers an apparatus for acquiring ultrasonic imaging data, and displaying that data on a suitable display, such as a video display screen. In the following description, numerous specific details are set forth such as specific hardware components, bit lengths, etc., in order to provide a thorough understanding of the present invention. It will be obvious, however, to one skilled in the art that these specific details may not be required to practice the instant invention. In other instances, well-known components of ultrasonic imaging apparatus have not been described in detail to not unnecessarily obscure the present invention.

FIGS. 3A and 3B illustrate a color flow processor known as the color Doppler imaging (CDI) module 300 which may be used in place of the prior art color flow module 104 of the system shown in FIGS. 1 and 2. CDI module 300 basically comprises three distinct components: a color data acquisition (CDA) board 302; a color Doppler processor (CDP) board 303; and a color Doppler controller (CDC) board 301. CDA board 302, and CDP board 303 are both linked via bus 340 to CDC board 301 for the control of sampling, processing, and timing of signals internal in CDI module 300. CDC board 301 is linked to the remainder of ultrasonic imaging system 100 via bus 120. CDC board 301 synchronizes each transmit/receive cycle of the acoustic pulses for Doppler processing. In other words, for each given acoustic pulse of the reference wave, the apparatus will wait a given period of time before the receiver circuitry is enabled. CDC board 301 also synchronizes each sampling of the Doppler data by CDA 302 and the corresponding DSP board 303 for signal processing. In addition, as shown in FIG. 3B, CDC board 301 comprises a color scan converter (CSC) interface 304 for converting processed information to a form suitable for display.

The next major element in CDI module 300 is the color data acquisition (CDA) board shown as 302 on FIGS. 3A and 3B. CDA board 302 comprises two major components: an analog in-phase (I) section 310; and an analog quadrature (Q) section 311. The analog in-phase section handles I data received from the radio frequency processor 103 via line 112. Analog quadrature section 311 handles Q data received from the processor 103 via line 112. Q section 311 is identical to I section 310 so only I section 310 is discussed here. In order to understand the architecture of each portion of CDA board 302, a discussion of vectors and color sample volumes (CSV's) in an ultrasonic imaging apparatus is required.

Referring to FIG. 4, a general representation of vectors and color sample volumes (CSV's) shown as 400. 400 may be loosely viewed as a representation of a two-dimensional area being scanned in a living organism and displayed on video display 130 of FIG. 1. Each column in 400 such as 410 is known as a vector and generally corresponds with a transducer element on a linear array type probe 101 of imaging apparatus 100. Alternatively, each vector may correspond with an element position for a motorized probe 101 in an alternative embodiment. Each element in a linear array probe 101 is used in both active and passive mode for transmitting and receiving acoustic pulses during transmit/receive (t/r) cycles of ultrasonic imaging apparatus 100. Also shown in 400 are rows 420 which are known as color sample volumes (CSV's). Therefore, for each vector such as 410 (element in a linear array probe or element position in a mechanical probe), there are a plurality of CSV's 420. Each CSV corresponds with a given depth in the scan area. So CSV 413 in vector 410 will be at a shallower depth than 415 of vector 410. In the preferred embodiment, each CSV may range between 0.5 millimeters and 1 centimeter in length. The total number of CSV's in each vector ranges between 1 and 128.

Returning to FIG. 3A, I section 310 comprises 8 matched filters 321 electrically coupled to an equal number of gain selects 320 which are coupled to input line 112 containing the I analog signal from RFP 103 of apparatus 100. Each matched filter such as 325 allows integration of the I signal over a period of time in order to optimize the signal-to-noise ratio of the signal passed to analog-to-digital (A/D) converters 323. Each matched filter integrates the signal over a period equal to the CSV or the amount of time when one CSV is received by the transducer to the next CSV. The amount of time matched filters 321 integrate is dependent upon the pulse repitition frequency (PRF—the frequency of the acoustic reference pulse from which a phase-shift and thus blood flow velocity may be determined). Each matched filter gain select such as 324 shown in FIG. 3A, has four possible settings depending on the length of each CSV and the time between each sampled CSV. Each matched filter gain is selectable via software with increases in gain being required for smaller CSV's. Matched filters 320 are further connected to a buffer area shown in FIG. 3A as buffers 322. Each buffer is then connected to a pair of corresponding A/D converters. For example, as shown in FIG. 3A buffer 326 is electrically coupled to matched filter 325 and matched filter gain select 324 is further coupled to A/D converters 327 and 328. These A/D converters will now be discussed.

Analog Q section 311 and analog I section 310 each comprise 16 A/D converters. The A/D converters are shown as 323 for I section 310. A/D converters 323 shown in analog I section 310 are coupled to the matched filter buffers 322. Each buffer such as 326 shown in FIG. 3A, is coupled to two A/D converters. For instance, as shown in FIG. 3A, buffer 326 is electrically coupled to the first A/D converter 327 and the ninth A/D converter 328. This allows digitizing of a first set of eight CSV's by the first set of eight A/D converters in block 323 (A/D converters 327 to 377), and the next set of eight CSV's to be processed by the second set of eight A/D converters shown in block 323 (A/D converters 328 to 329). The same matched filters, however, are used for every eight CSV's. Therefore, as each CSV in a vector is processed, the first matched filter 325 and the first A/D converter 327 will filter and digitize the signal. The second CSV in the vector will be processed by the second matched filter 371 and second A/D converter 373. This continues until the ninth CSV in the vector. When the ninth CSV is received by the receiver circuitry in probe 101, the first matched filter 325 will process the signal, however, the ninth A/D converter 328 will digitize the signal. The sampling of the second set of CSV's will continue until the eighth matched filter 375 obtains the last in the second set of CSV's. That signal is digitized by the sixteenth A/D converter 329. On the next sampling cycle of the CSV's, the process starts over with the first matched filter 325 receiving the first CSV and the first A/D converter 327 digitizing the signal.

For instance, with reference to FIG. 4, the first eight CSV's 411 in vector 410 will be digitized by A/D converters 327 through 377. CSV 413 in vector 410 will be processed by gain select 324, matched filter 325, buffer 326 and digitized by A/D converter 327. The next CSV 415 in vector 410 will be processed by gain select 370, matched filter 371, buffer 372 and digitized by A/D converter 373. The eighth CSV 417 in vector 410 will be processed by gain select 374, matched filter 375, buffer 376 and be digitized by A/D converter 377. The next CSV 418 in vector 410 will be processed by gain select 324, matched filter 325 and buffer 326, but will be digitized by the ninth A/D converter 328. As mentioned previously, this will continue until the second set of eight CSV's 412 have been processed wherein CSV 419 will be processed by 374, 375, and 376, and will be digitized by the sixteenth A/D converter 329 shown in FIG. 3A. The next eight CSV's in vector 410 will then be processed by the first eight A/D converters, and so on, until the last CSV 416 in vector 410 has been processed.

Each A/D converter in analog I section 310 generates serial data output on lines 330 shown in FIGS. 3A and 3B. The digitized signals from the A/D converters of analog Q section 311 of CDA board 302 are also output in a serial fashion on lines 331 of FIGS. 3A and 3B. Lines 330 and 331 are input to a delay multiplexing circuit shown generally as 350 in FIG. 3B and output onto lines 332. Each multiplexing circuit of 350, for instance 351, will delay by sixteen bits the data received from lines 331. Therefore, data on lines 332 will first be received from lines 330 serially for 16 bits of data. Then, data will be received from lines 331 (which have been delayed by 16 bits) and continue on lines 332. Therefore, each digital signal processor in section 360 of DSP board 303 will receive the data over lines 332 in a serial synchronized fashion with the sixteen bits of I data from lines 330 preceding the sixteen bits of Q data received from lines 331. The most significant bit of each of the I and Q data will be transmitted first. Circuit 350 therefore transforms each of the I and Q digitized data into a 32 bit synchronous bit stream. This is accomplished through the use of a PAL (Programmed Array Logic) in the preferred embodiment, but circuit 351 may be a shift register or other similar circuitry coupled to lines 331 in alternative embodiments.

All data is transmitted from A/D converters 323 in a serial synchronized fashion and is clocked at a rate of 4.8 MHz by CDC board 301. Each of the lines 332 from circuit 350 is received by digital signal processors (DSP's) 360 shown in FIG. 3B. As shown in FIG. 3B, CDP board 303 comprises 16 digital signal processors 360 along with their corresponding memories 365. Each DSP used in CDP board 303 of the preferred embodiment, such as 361 in FIGS. 3A and 3B, is an AT & T DSP 32C 32-bit floating point digital signal processing chip manufactured by American Telephone and Telegraph. Each digital signal processing chip such as 361 allows digital filtering of the signals received over lines 332 received from CDA board 302 shown in FIG. 3A. Each DSP performs operations on each 32 bit word (combined I and Q data) that is received over lines 332.

First, for each 16 bit word for the I and Q data respectively, the values are tested to determine whether they have reached a saturation or overflow condition. If the value has reached an overflow condition, then an overflow counter for the particular I or Q value is incremented. Then, each of the I and Q values, respectively, are converted from their fixed point representation generated by the 16 bit A/D converters 323 to a floating point representation may be used within the DSP's for filtering and computation of various information. Calculations are then performed on the filtered data to extract estimates of three parameters from the Doppler shift information. These are I(n), the intensity of the Doppler signal, F(n), the mean frequency shift of the Doppler signal, and V(n), the variance of the frequency shift of the Doppler signal.

After computation of the three flow parameters, the values of I(n), F(n) and V(n) are converted to a fixed point representation, and combined into a 16 bit word for output to the CSC interface 304, which is a part of CDC board 301. From there, data is transmitted to the color scan converter 108 via line 117. In the preferred embodiment, the four most significant bits of the word transmitted on line 391 to the CSC interface 304 contain I(n) (intensity), the next six bits contain V(n) (variance) and the last six bits contain F(n) (frequency or velocity). These are transmitted by CSC interface 304 to the color scan converter 108 in an eight bit parallel fashion over line 117 for interpolation between vectors and CSV's by color scan converter 108. The result may then be displayed on video display 130.

Using the architecture of the preferred embodiment, it can be appreciated that no clutter or fixed target removal must be done prior to digitization for processing and display by flow processor 300, as in the prior art color flow processor 200 described with reference to FIG. 2. Since the filtering and clutter removal has all been accomplished at the level of the DSP's 360, shown in FIG. 3B, convenient manipulation of control and filtering parameters of the various equations for generating the intensity, variance and frequency information may be accomplished, varying the sensitivity of the apparatus as well as adding flexibility.

In the foregoing specification, the invention is described with reference to specific embodiments thereof. It will, however, be evident that various modifications and changes may be made thereto without departing from the broad scale or spirit of the invention as set forth in the appended claims. The specification and drawings are, accordingly, regarded in an illustrative rather than a restrictive sense.

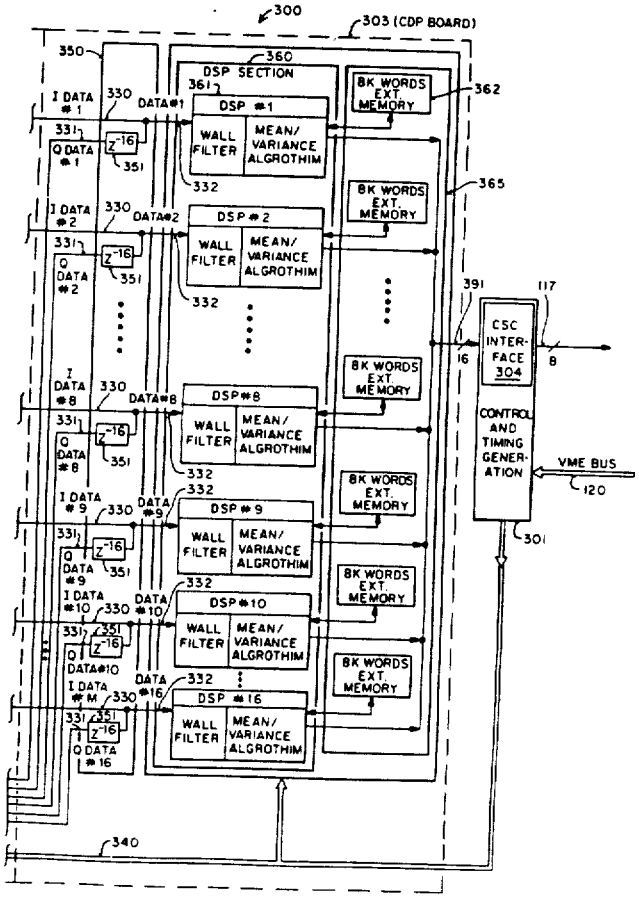

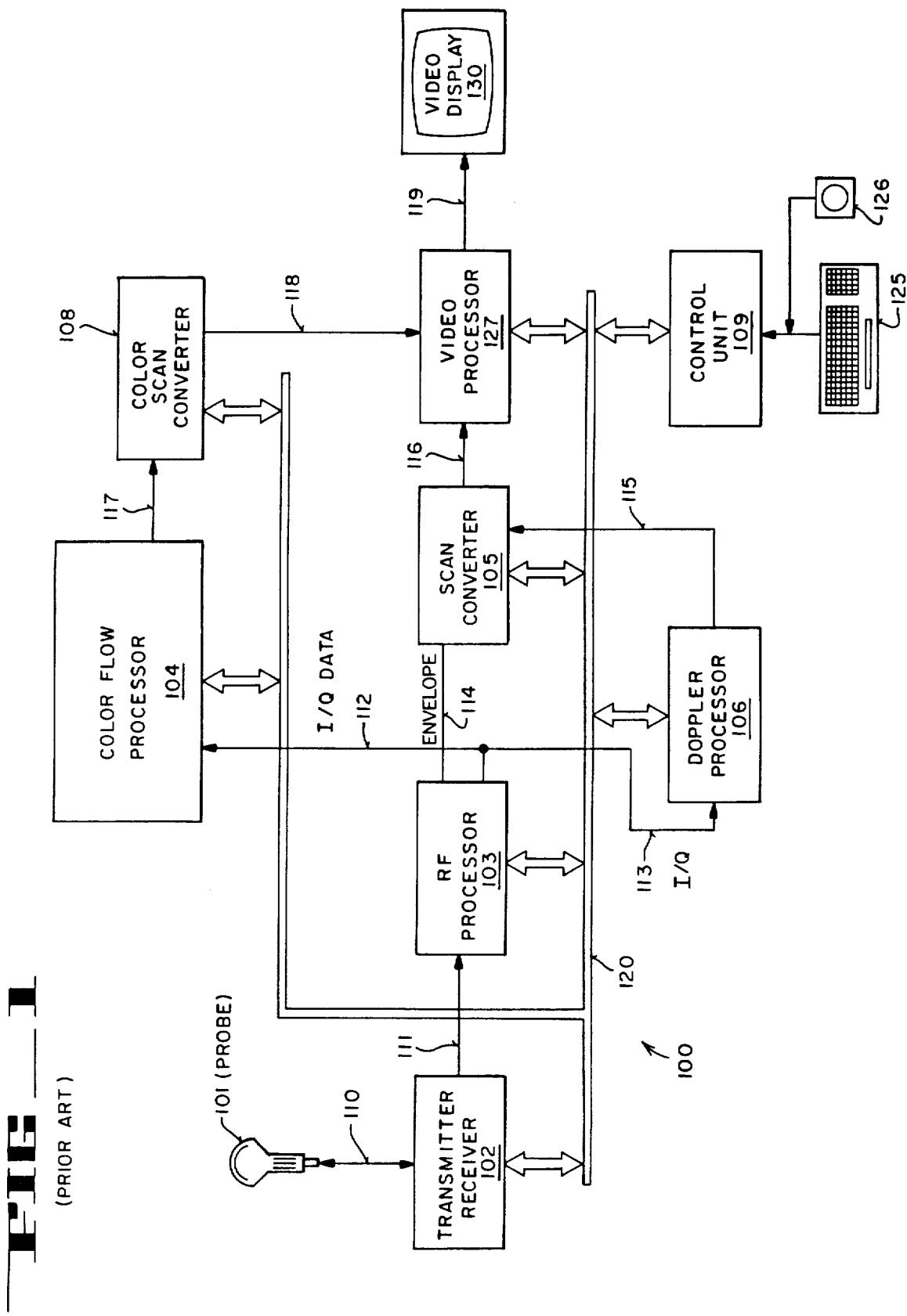

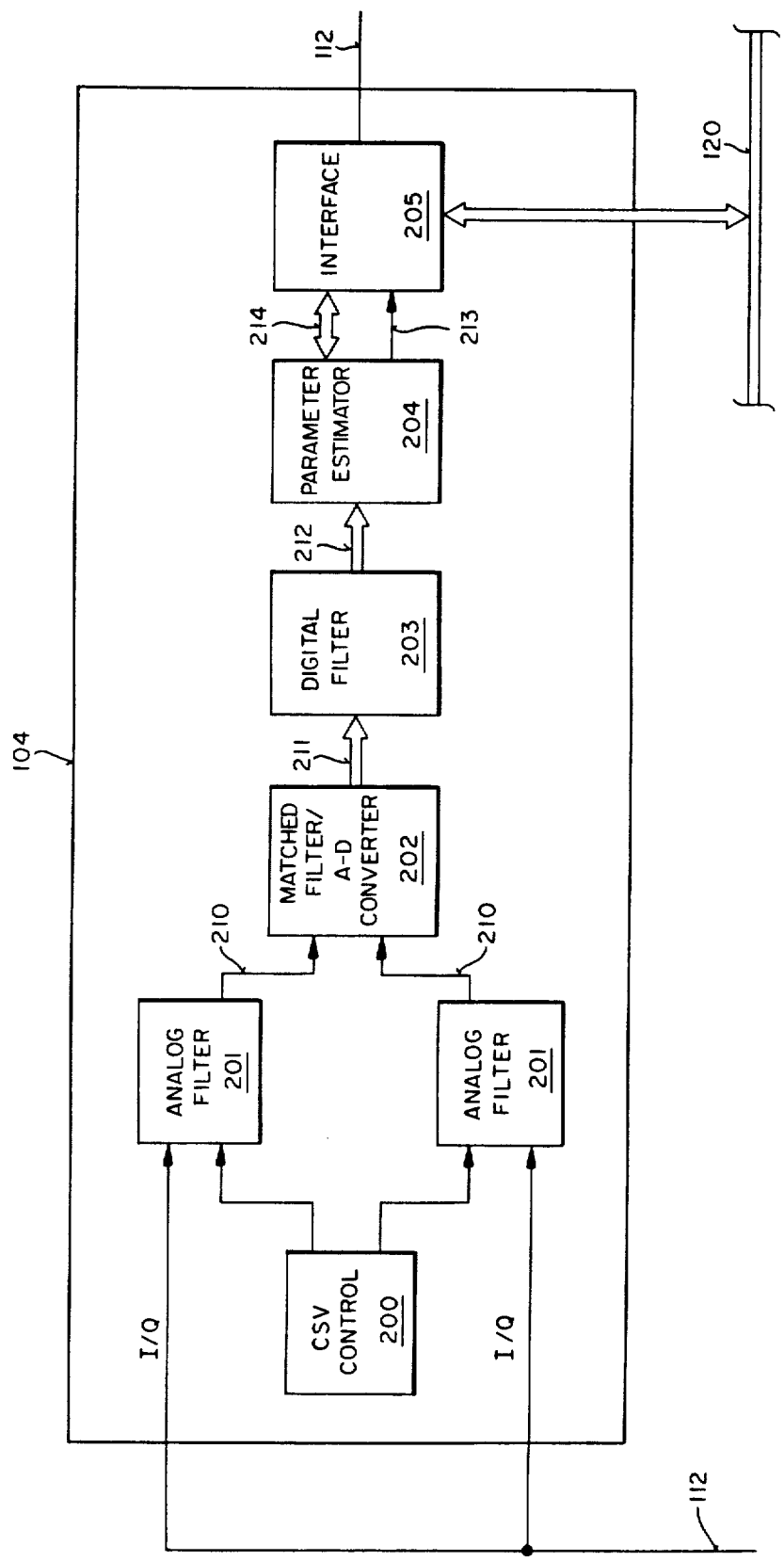

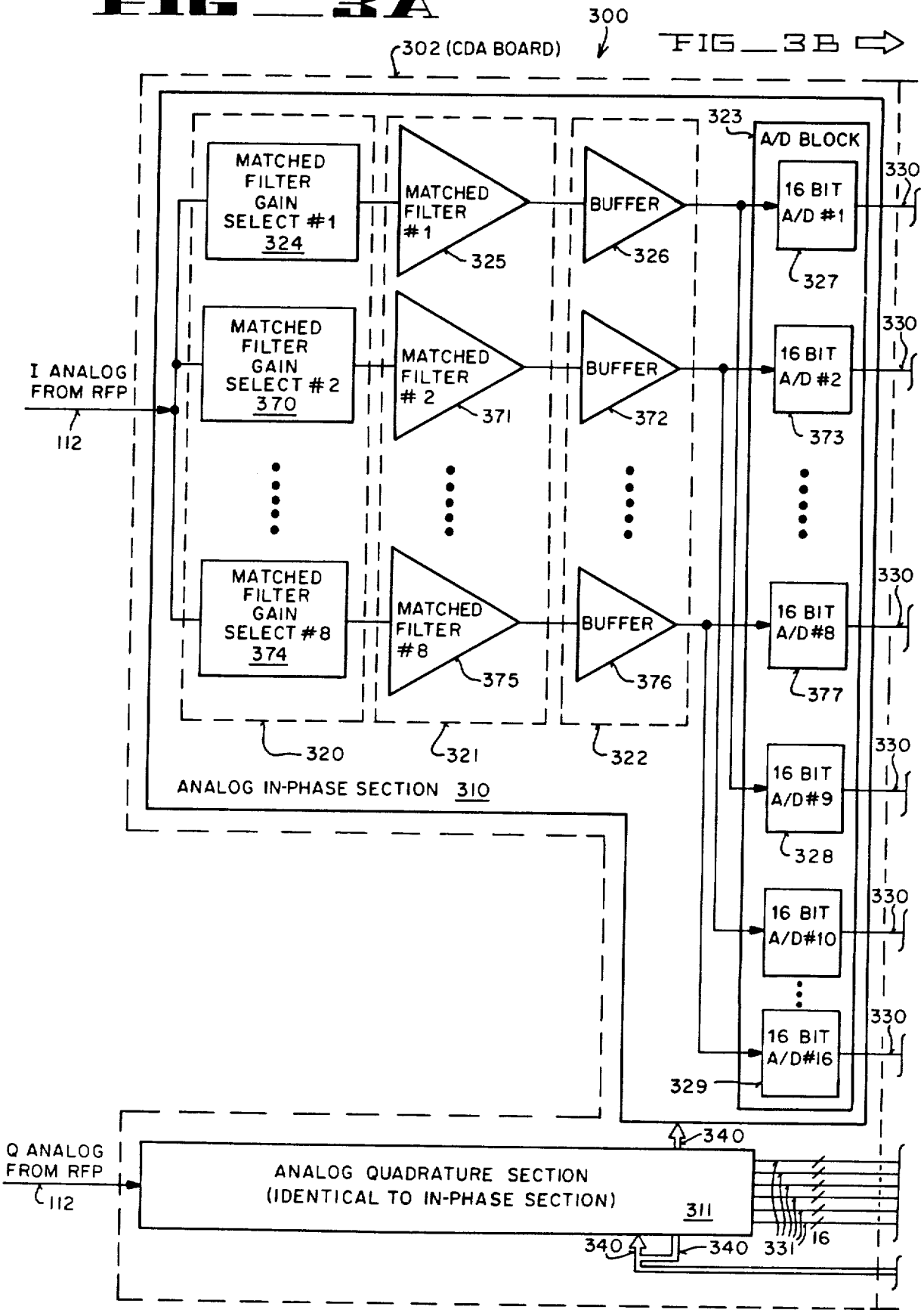

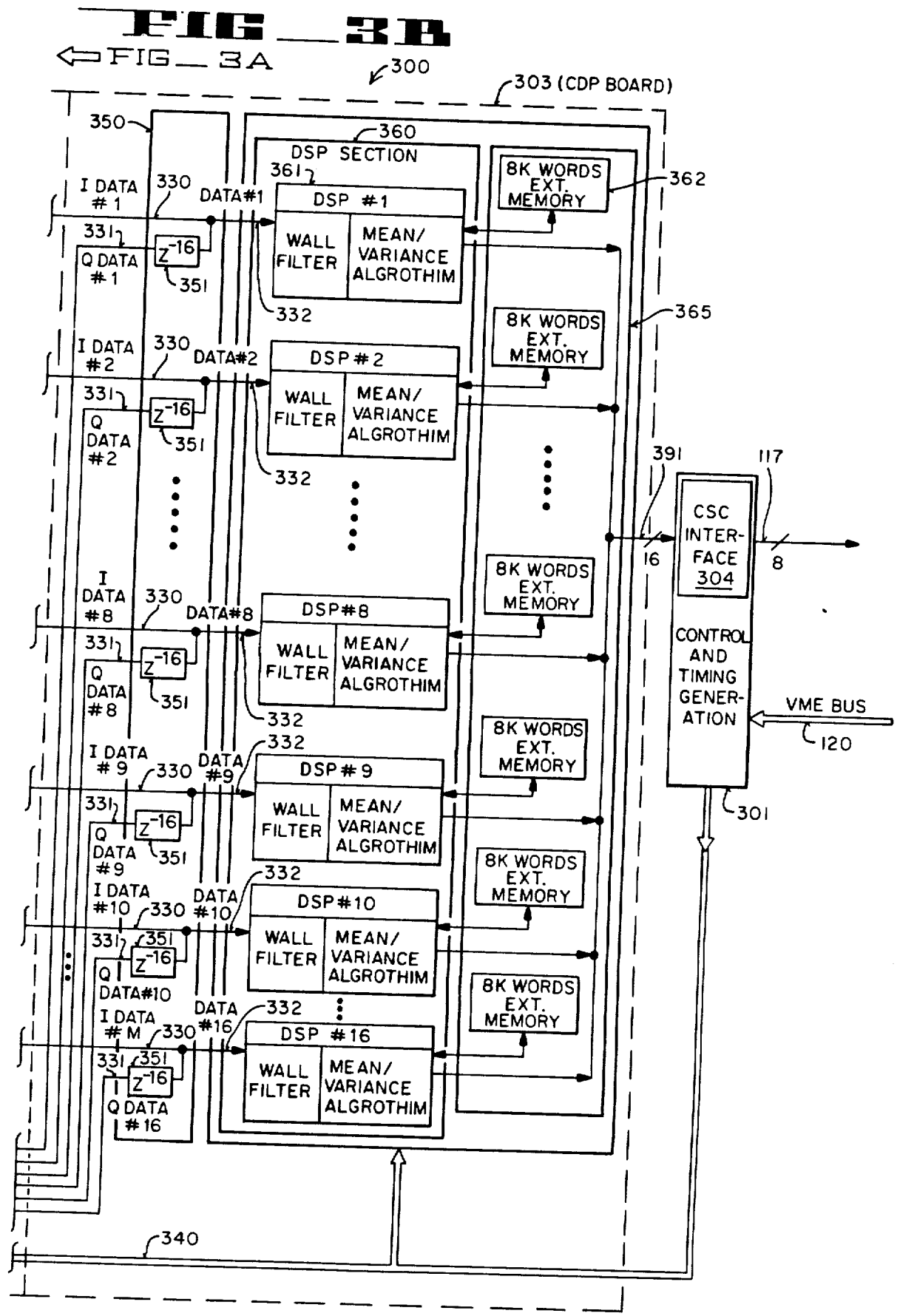

What is claimed is:

1. An apparatus for processing Doppler signal data in real time for an ultrasonic imaging apparatus comprising:
   a. a receiver for receiving reflected Doppler signals produced by reflecting a reference pulsed acoustic signal;
   b. a plurality of integrators coupled to the receiver for integrating the reflected Doppler signals over a first period of time to maximize the signal-to-noise ratio of the reflected Doppler signals;
   c. a plurality of analog-to-digital converters coupled to the integrators for digitizing the reflected Doppler signals each of the analog-to-digital converters outputting a plurality of digitized Doppler signals;
   d. a plurality of digital signal processors, each of the plurality of digital signal processors coupled to each of the plurality of analog-to-digital converters for processing the plurality of digitized Doppler signals, each of the digital signal processors outputting a plurality of processed digital signals; and
   e. a controller coupled to the receiver, the integrators, the analog-to-digital converters and the digital signal processors, for controlling the operation of the integrators, analog-to-digital converters and digital signal processors, controlling the receipt of the processed digital signals, and compressing each of the plurality of processed digital signals output from the plurality of digital signal processors into a plurality of signals suitable for display.

2. The apparatus of claim 1 wherein the analog-to-digital converters comprise a first set of analog-to-digital converters for digitizing analog in-phase reflected signals from the reference pulsed acoustic signal, and a second set of analog-to-digital converters for digitizing analog quadrature reflected signals from the reference pulsed acoustic signal.

3. The apparatus of claim 2 wherein the first set of analog-to-digital converters comprises a first subset of I analog-to-digital converters, the second set of analog-to-digital converters comprises a first subset of Q analog-to-digital converters, the first subsets of I and Q analog-to-digital converters for processing a first set of color sample volumes in a vector from the reference pulsed acoustic signal, and the first set of analog-to-digital converters comprises a second subset of I analog-to-digital converters, and the second set of analog-to-digital converters comprises a second subset of Q analog-to-digital converters, the second subsets of I and Q analog-to-digital converters for processing a second set of color sample volumes in each vector of reflected signals from the reference pulsed acoustic signal.

4. The apparatus of claim 3 wherein the first set and the second set of analog-to-digital converters each comprise sixteen analog-to-digital converters.

5. The apparatus of claim 4 wherein the plurality of digitized Doppler signals each comprises sixteen bits.

6. The apparatus of claim 4 wherein the plurality of processed Doppler signals each comprises sixteen bits.

7. The apparatus of claim 4 wherein the plurality of signals suitable for display each comprises eight bits.

8. An apparatus for processing Doppler signal data in real time for an ultrasonic imaging apparatus comprising:

a. first and second analog-to-digital (A/D) converters, the first A/D converters for digitizing analog in-phase reflected (first) signals from a reference pulsed acoustic signal, and the second A/D converters for digitizing analog quadrature reflected (second) signals from the reference pulsed acoustic signal, the first A/D converters having a first set of first A/D converters, the second A/D converters having a first set of second A/D converters, the first sets of first and second A/D converters for processing a first set of color sample volumes in a vector from the reference pulsed acoustic signal, the first A/D converters further having a second set of first A/D converters, and the second A/D converters further having a second set of second A/D converters, the second sets of first and second A/D converters for processing a second set of color sample volumes in each vector of reflected signals from the reference pulsed acoustic signal, the first and second A/D converters outputting a plurality of digitized Doppler signals;

b. a plurality of digital signal processors, each of the plurality of digital signal processors coupled to the first and second A/D converters for processing the plurality of digitized Doppler signals, each of the digital signal processors outputting a plurality of processed digital signals; and c. a controller coupled to the first and second A/D converters and the digital signal processors for controlling the operation of the first and second A/D converters and digital signal processors, controlling the receipt of the processed digital signals, and compressing each of the plurality of processed digital signals output from the plurality of digital signal processors into a plurality of signals suitable for display.

9. The apparatus of claim 8 wherein the first and second A/D converters each comprise sixteen A/D converters.

10. The apparatus of claim 9 wherein the plurality of digitized Doppler signals each comprises sixteen bits.

11. The apparatus of claim 9 wherein the plurality of processed Doppler signals each comprises sixteen bits.

12. The apparatus of claim 9 wherein the plurality of signals suitable for display each comprises eight bits.

* * * * *

UNITED STATES PATENT AND TRADEMARK OFFICE
CERTIFICATE OF CORRECTION

PATENT NO.   :   5,058,593

DATED        :   October 22, 1991

INVENTOR(S)  :   Steven F. Forestieri, Sheng T. Lin, John J. Lum,
                 William A. Rains, Steven A. McNerney It is certified that error appears in the above-identified patent and that said Letters Patent is hereby corrected as shown below:

The title page, should be deleted to be replaced with the attached title page.

IN THE DRAWINGS:

Delete Sheet 1, Figure 1 and replace with Sheet 1, Figure 1 as shown on the attached page.

Delete Sheet 2, Figure 2 and replace with Sheet 2, Figure 2 as shown on the attached page.

Delete Sheet 3, Figure 3A and replace with Sheet 3, Figure 3A as shown on the attached page.

Delete Sheet 4, Figure 3B and replace with Sheet 4, Figure 3B as shown on the attached page.

Signed and Sealed this

Fourth Day of May, 1993

Attest:

MICHAEL K. KIRK

*Attesting Officer*        *Acting Commissioner of Patents and Trademarks*

United States Patent [19]
Forestieri et al.

[11] Patent Number: 5,058,593
[45] Date of Patent: Oct. 22, 1991

[54] APPARATUS FOR PROCESSING AND DISPLAYING ULTRASONIC DATA

[75] Inventors: Steven F. Forestieri; Sheng T. Lin, both of Santa Clara; John J. Lum, San Francisco; William A. Rains, Aptos; Steven A. McNerney, Sunnyvale, all of Calif.

[73] Assignee: Diasonics, Inc., Milpitas, Calif.

[21] Appl. No.: 584,191

[22] Filed: Sep. 18, 1990

[51] Int. Cl.$^5$ .................................... A61B 8/00
[52] U.S. Cl. ..................... 128/661.07; 128/661.09; 358/112; 358/167
[58] Field of Search ............. 128/660.04, 660.05, 128/661.08, 661.09, 661.07; 358/112, 166, 167

[56] References Cited

U.S. PATENT DOCUMENTS

| | | | |
|---|---|---|---|
| 4,690,150 | 9/1987 | Mayo, Jr. | 358/112 |
| 4,742,830 | 5/1988 | Tamano et al. | 128/661.09 |
| 4,817,619 | 4/1989 | Sugiyama et al. | 128/661.09 |
| 4,827,942 | 5/1989 | Lipschutz | 358/112 |
| 4,918,605 | 4/1990 | Shirasaka | 128/660.05 |

*Primary Examiner*—Francis Jaworski
*Assistant Examiner*—George Manuel
*Attorney, Agent, or Firm*—Blakely, Sokoloff, Taylor & Zafman

[57] ABSTRACT

An apparatus and method for displaying ultrasonic data in real time reflected in a living organism. The apparatus comprises a plurality of analog-to-digital converters for digitizing reflected Doppler signals produced by reflecting a reference pulsed acoustic signal, each of the analog-to-digital converters capable of producing a plurality of digitized Doppler signals. The apparatus futher comprises a plurality of digital signal processors, each of the plurality of digital signal processors coupled to each of the plurality of analog-to-digital converters for processing digitized Doppler signals received from the analog-to-digital converters, each of the digital signal processors capable of producing a plurality of processed digital signals. The apparatus further comprises a controller coupled to the analog-to-digital converters and the digital signal processors for controlling the operation of the analog-to-digital converters and digital signal processors, controlling the receipt of the processed digital signals, and compressing each of the plurality of processed digital signals output from the plurality of digital signal processors into a plurality of signals suitable for display.

12 Claims, 5 Drawing Sheets